US010601225B2

(12) United States Patent
Imai et al.

(10) Patent No.: US 10,601,225 B2
(45) Date of Patent: Mar. 24, 2020

(54) MANAGEMENT DEVICE, MANAGEMENT SYSTEM, CONTROL METHOD FOR MANAGEMENT DEVICE, AND CONTROL PROGRAM

(71) Applicant: OMRON CORPORATION, Kyoto-shi, Kyoto (JP)

(72) Inventors: Hiroshi Imai, Nara (JP); Hiromasa Takatsuka, Tokyo (JP); Masayo Ikuta, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/551,677

(22) PCT Filed: Feb. 12, 2016

(86) PCT No.: PCT/JP2016/054092
§ 371 (c)(1),
(2) Date: Aug. 17, 2017

(87) PCT Pub. No.: WO2016/158028
PCT Pub. Date: Oct. 6, 2016

(65) Prior Publication Data
US 2018/0034273 A1  Feb. 1, 2018

(30) Foreign Application Priority Data

Mar. 30, 2015  (JP) ................................. 2015-070181

(51) Int. Cl.
*H02J 3/14* (2006.01)
*H02J 13/00* (2006.01)
(Continued)

(52) U.S. Cl.
CPC ................ *H02J 3/14* (2013.01); *G05B 15/02* (2013.01); *G06Q 50/06* (2013.01); *H02J 3/00* (2013.01);
(Continued)

(58) Field of Classification Search
CPC .. G06F 1/206; G06F 13/4068; G06F 13/4018; G05B 15/02; Y02D 10/151; Y02D 10/14
See application file for complete search history.

(56) References Cited

U.S. PATENT DOCUMENTS 8,103,389 B2 * 1/2012 Golden ..................... H02J 3/14
                                                     700/295
8,219,505 B2 * 7/2012 Richard ................. G06Q 10/04
                                                     705/412

(Continued)

FOREIGN PATENT DOCUMENTS

JP   2000-264039 A    9/2000
JP   2012-130167 A    7/2012
(Continued)

OTHER PUBLICATIONS

The translated International Search Report of PCT/JP2016/054092 dated May 31, 2016.

*Primary Examiner* — Charles R Kasenge
(74) *Attorney, Agent, or Firm* — Metrolex IP Law Group, PLLC

(57) ABSTRACT

A management device includes a potential usable power calculator that computes a measurement value or an estimated value for a potential usable power which is the amount of power available when the power consumption of an electrical appliance and a potential feed-in amount that can be sold are excluded from the power output from the solar power device; a planned usage determination unit that identifies a planned usage time that a user plans to use a designated appliance; an effective time determination unit that identifies a continuous effective time when a physical quantity representing a state that changes due to the designated appliance using the potential usable power is within a range that is effective for a user; and a scheduler that creates an operation schedule indicating at least an operation start (Continued)

time for the designated appliance on the basis of the planned usage time and the continuous effective time.

4 Claims, 10 Drawing Sheets

(51) Int. Cl.
  *G05B 15/02* (2006.01)
  *H02J 3/00* (2006.01)
  *H02J 3/38* (2006.01)
  *G06Q 50/06* (2012.01)

(52) U.S. Cl.
  CPC ............... *H02J 3/38* (2013.01); *H02J 13/00* (2013.01); *H02J 13/0017* (2013.01); *H02J 3/383* (2013.01); *H02J 2003/003* (2013.01); *Y02B 70/3225* (2013.01); *Y02B 70/3266* (2013.01); *Y02P 90/40* (2015.11); *Y04S 20/222* (2013.01); *Y04S 20/224* (2013.01); *Y04S 20/242* (2013.01)

(56) References Cited

U.S. PATENT DOCUMENTS

| | | | | |
|---|---|---|---|---|
| 8,521,337 | B1* | 8/2013 | Johnson | H02J 3/008 370/252 |
| 8,689,020 | B2* | 4/2014 | Massey | G06Q 10/06 713/300 |
| 8,903,560 | B2* | 12/2014 | Miller | G06Q 50/06 700/291 |
| 2006/0276938 | A1* | 12/2006 | Miller | G06Q 50/06 700/295 |
| 2012/0143385 | A1* | 6/2012 | Goldsmith | H02J 3/38 700/297 |
| 2012/0232706 | A1* | 9/2012 | Hayashida | F24D 19/1039 700/282 |
| 2012/0235478 | A1* | 9/2012 | Hayashida | F24D 17/02 307/11 |
| 2013/0047010 | A1* | 2/2013 | Massey | G06Q 10/06 713/320 |
| 2013/0073105 | A1* | 3/2013 | Schmid | H02J 3/382 700/295 |
| 2013/0088083 | A1* | 4/2013 | Tominaga | H02J 3/14 307/52 |
| 2013/0144451 | A1* | 6/2013 | Kumar | G05B 13/02 700/291 |
| 2013/0162037 | A1* | 6/2013 | Kim | H02J 7/0068 307/24 |
| 2013/0218355 | A1* | 8/2013 | Lazaris | G06Q 30/0605 700/291 |
| 2013/0229059 | A1 | 9/2013 | Baba et al. | |
| 2014/0049217 | A1* | 2/2014 | Nakagawa | B60L 53/52 320/109 |
| 2016/0011577 | A1* | 1/2016 | Schwarz | G05B 15/02 700/295 |

FOREIGN PATENT DOCUMENTS

| | | |
|---|---|---|
| JP | 2013-027161 A | 2/2013 |
| JP | 2013-190155 A | 9/2013 |
| JP | 2014-166114 A | 9/2014 |
| JP | 2014-176161 A | 9/2014 |
| JP | 2014-187876 A | 10/2014 |
| JP | 2014-197960 A | 10/2014 |
| WO | 2012/090365 A1 | 7/2012 |
| WO | 2012/120736 A1 | 9/2012 |
| WO | 2015/002092 A1 | 1/2015 |

\* cited by examiner

MANAGEMENT DEVICE, MANAGEMENT SYSTEM, CONTROL METHOD FOR MANAGEMENT DEVICE, AND CONTROL PROGRAM

FIELD

The present invention relates to a management device for managing a power generator and an electrical appliance, a management system, a control method for a management device, a control program.

BACKGROUND

A growing number of factories and residences are installing solar power devices. Electrical appliances in the factory or the home may consume the energy generated by a solar power device with the remaining surplus energy sold back to the power company. This kind of solar power device requires a power control device that controls the supply of the energy generated by the solar power device.

While the power control device may supply the surplus energy to the power company's power grid, the surplus energy cannot be supplied to the grid, i.e., sold back to the power company when the voltage setting of the grid exceeds a certain value (set point) the surplus energy cannot be supplied to the grid. In this case, some or all the surplus energy is not used, but cannot be sold back to the grid, i.e., this creates potential usable energy.

Consequently, techniques for making this potential usable energy available have been disclosed. For instance, Patent Document 1 describes a power control device that terminates supply of surplus energy to the grid when the voltage setting of the grid exceeds a threshold, and modifying the operation of an electrical appliance so that the appliance consumes more power. Patent Document 2 also describes a power control device; the device controls supply to the grid and the charging and discharging of a battery to thereby ensure that the voltage setting of the grid remains at or below a predetermined threshold.

RELATED ART DOCUMENTS

Patent Documents

Patent Document 1: Japanese Patent Publication No. 2014-197960 (published 16 Oct. 2014)
Patent Document 2: Japanese Patent Publication No. 2014-187876 (published 2 Oct. 2014)

SUMMARY

Despite that in some instances the existing technologies described above fail to effectively take advantage of the potential usable energy.

More specifically, even if the potential usable energy were available for operating an electrical appliance, there may be no benefit of this availability to the user if the user does not operate the appliance immediately. In this case, the potential usable energy is merely being consumed, and so this cannot be considered effective use of the potential usable energy.

Embodiments of the present invention address the foregoing challenges by providing a management device, a control method for the management device, and the control program that effectively uses potential usable energy.

To address the aforementioned challenges a management device according to embodiments of the invention is configured to manage a power generator and an electrical appliance, the management device including: a potential usable power calculator configured to compute a measurement value or an estimated value for a potential usable power which is the amount of power available when the power consumption of the electrical appliance and a potential feed-in amount that can be sold are excluded from the power output from the power generator; a planned usage determination unit configured to identify a planned usage time that a user of a designated appliance plans to use the designated appliance; an effective time determination unit configured to identify a continuous effective time when a physical quantity representing a state that changes due to the designated appliance using the potential usable power is within a range that is effective for a user of said designated appliance; and a scheduler configured to create an operation schedule indicating at least an operation start time for the designated appliance on the basis of the planned usage time and the continuous effective time.

According to this configuration creates an operation schedule for the designated appliance on the basis of the planned usage time and the continuous effective time. The potential usable energy can thus be used to operate the designated appliance most likely to provide a benefit for use thereof. Embodiments of the present invention are therefore able to effectively use potential usable energy. The aforementioned configuration also allows effective use of potential usable energy without introducing special devices such as storage batteries or the like (i.e., with less startup investment costs).

The scheduler in a management device according to the embodiments may also determine an operation schedule for the planned usage time on the basis of additional power consumption required to ensure that the physical quantity representing the state that changes due to the designated appliance is within a range that is effective for the user.

The aforementioned configuration makes use of the potential usable energy while accounting for the overall costs.

The operation schedule in a management device according to the embodiments may further indicate an operation period for the designated appliance.

The scheduler in a management device according to the embodiments may determine an operation schedule for a plurality of designated appliances where at least any of the power consumption and the period required for operation is different.

The scheduler in a management device according to the embodiments may determine an operation schedule that maximizes the usage rate for the potential usable power.

The aforementioned configuration maximizes the use efficiency for the potential usable power.

The scheduler in a management device according to the embodiments may determine the operation schedule on the basis of a physical quantity indicating the state of the designated appliance.

In the aforementioned configuration the scheduler may, for instance, specify the power required by the designated appliance on the basis of the physical quantity representing the state of said designated appliance. The scheduler may therefore determine an operation schedule responsive to the state of the designated appliance.

In a management device according the embodiments the potential usable power calculator may compute an estimated value for the potential usable power during a predetermined period by subtracting an estimated value for the power consumption during the predetermined period and an estimated value for the potential feed-in amount during the predetermined period from an estimated value for the power output during the predetermined period.

With the aforementioned configuration, the potential usable power may be estimated by estimating the power output, the power consumption, and the potential feed-in amount.

In a management device according to the embodiments the potential usable power calculator may computes a measurement value for the potential usable power by subtracting a measurement value for the power consumption and a measurement value for the potential feed-in amount from a measurement value for the power output.

With the aforementioned configuration, a measurement value may be computed for the potential usable power by measuring the power output, the power consumption, and the potential feed-in amount.

The management device according to the embodiments may further include a data acquisition unit configured to acquire power data from a meter, the power data representing a measurement value for at least any of the power output, the power consumption, and a feed-in amount; and the potential usable power calculator may update the estimated value for the potential usable power during the predetermined period on the basis of the power data.

According to the aforementioned configuration the potential usable power calculator may update an estimated value for the potential usable power on the basis of at least any of the measurement values for the power output, the power consumption, and the feed-in amount measured by the meter. It is therefore possible to improve the accuracy of estimating the potential usable power. Moreover, it is also possible more efficiently take advantage of the potential usable energy.

In a management device according to the embodiments the data acquisition unit acquires power data from a meter representing measurement values for the power output, the power consumption, and a feed-in amount; the potential usable power calculator computes a measurement value for the potential usable power by subtracting a measurement value for the power consumption and a measurement value for the potential feed-in amount from a measurement value for the power output; and the management device may further include: an assessment unit configured to determine whether or not the difference between the estimated value and the measurement value for the potential usable power is greater than or equal to a predetermined value; and the potential usable power calculator is configured to update the estimated value for the potential usable power when the difference is greater than or equal to a predetermined value.

The aforementioned configuration updates the estimated value for the potential usable power when there is an offset between the estimated value and the measurement value for the potential usable power. This prevents unnecessary updates to the potential usable power.

A management device according to the embodiments may further include an appliance controller configured to operate the designated appliance on the basis of the operation schedule.

The aforementioned configuration saves on electricity costs because the designated appliance is operated using the potential usable energy. The appliance controller also operates the designated appliance automatically, eliminating the inconvenience to the consumer.

A management device according to the embodiments may at least one of the power generator and the electrical appliance owned by a plurality of consumers.

The scheduler in a management device according to the embodiments may determine which of the designated appliances in the plurality of electrical appliances owned by the plurality of consumers is to receive potential usable energy.

The scheduler in a management device according to the embodiments may determine an operation schedule for the designated appliances taking into account a distribution loss that occurs when power is distributed via a distribution network interconnecting the plurality of consumers.

A management system according to the embodiments includes a management device as above described, said a power generator and said electrical appliance.

To address the aforementioned challenges a control method for a management device configured to manage a power generator and an electrical appliance, the control method with steps including computing a measurement value or an estimated value for a potential usable power which is the amount of power available when the power consumption of the electrical appliance and a potential feed-in amount that can be sold are excluded from the power output from the power generator; identifying a planned usage time that a user of a designated appliance plans to use the designated appliance; identifying a continuous effective time when a physical quantity representing a state that changes due to the designated appliance using the potential usable power is within a range that is effective for a user of said designated appliance; and creating an operation schedule indicating at least an operation start time for the designated appliance on the basis of the planned usage time and the continuous effective time.

The aforementioned configuration provides the same effects as the aforementioned management device.

The embodiments of the management device according to the present invention may be implemented on a computer. In this case, a control program for a management device configured to cause a computer to function as a management device provided with each of the above components, and a computer readable medium whereupon said control program is stored are within the scope of the invention.

Effects

Embodiments of the present invention are able to effectively use potential usable energy.

DETAILED DESCRIPTION

An embodiment of the present invention is described below on the basis of FIG. 1 through FIG. 6.

Management System

Figure 1:
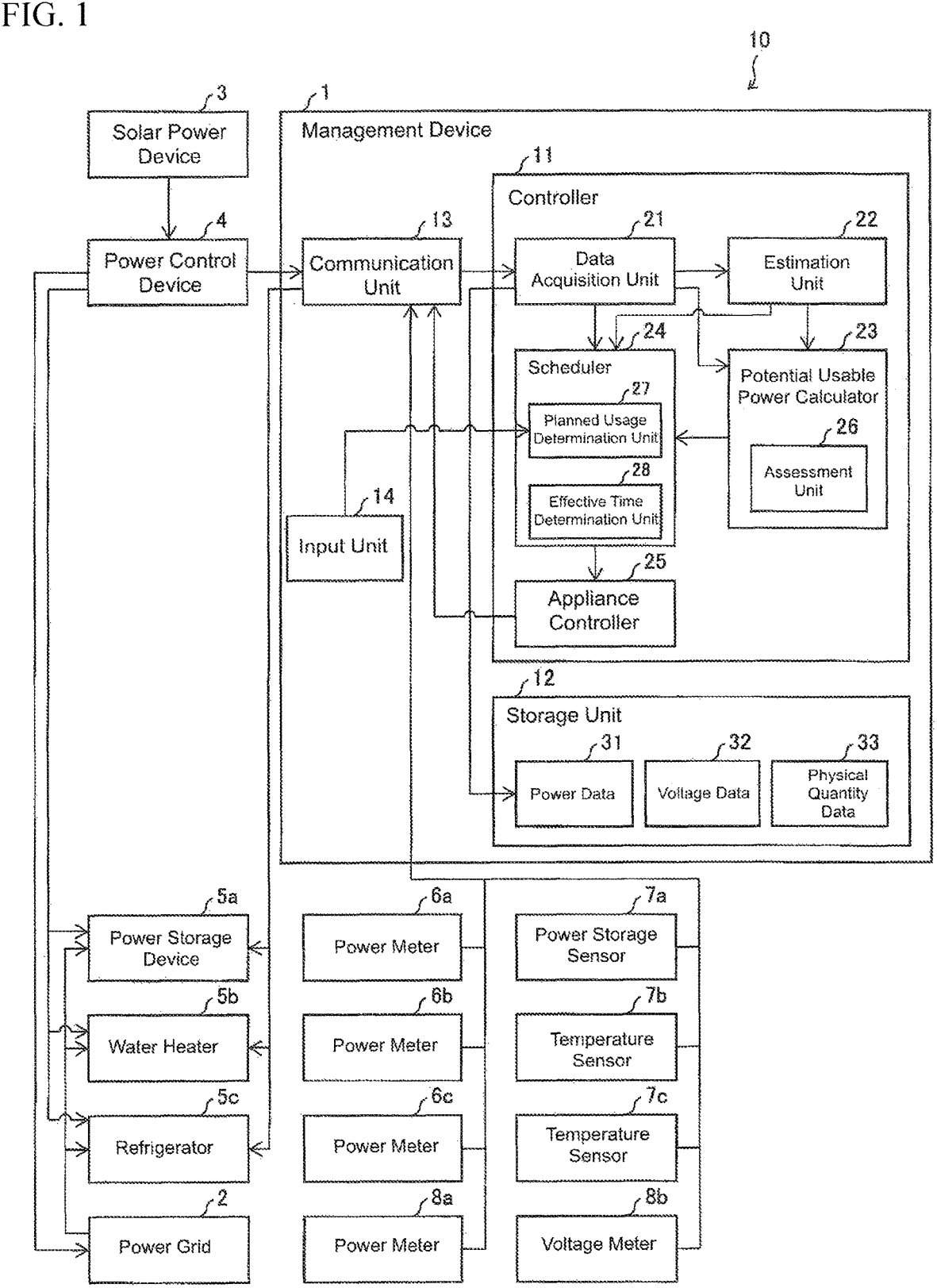
FIG. 1 is a block diagram illustrating an overview of a management system according to the present invention, and an example of the main components of a management device provided in the management system of the example.

An overview of a management system 10 according to the present invention is described on the basis of FIG. 1. FIG. 1 is a block diagram illustrating an overview of a management system 10 according to the present invention, and an example of the main components of a management device 1 provided in the management system 10; the management system 10 includes a management device 1, a power control device 4, and at least one meter. The term "meter" collectively refers to the power meters 6a-6c and 8a, as well as the power storage sensor 7a, the temperature sensor 7b, the temperature sensor 7c, and the voltage meter 8b.

The management device 1 controls a power generator and an electrical appliance installed on-site at consumer factories, homes, or the like. A detailed configuration of the management device 1 is described later.

In the example illustrated in FIG. 1, the management device 1 controls a solar power device 3 serving as the power generator, and a power storage device 5a, a water heater 5b, and a refrigerator 5c which are the appliances. However, the devices controlled by the management device 1 are not limited thereto. Instead of a solar power device 3 the management device 1 may control any other kind of power generating device such as a wind power generator, or a fuel cell, and may also control a plurality of power generating devices. The management device 1 may also control one or a plurality of electrical appliances and may control any electrical appliance that consumes energy to function.

The solar power device 3 converts solar energy to electrical power. The solar power device 3 supplies the energy it generates to the power control device 4.

The power control device 4 controls the energy generated by the solar power device 3 and is known as a power conditioner. The power control device 4 supplies an electrical appliance with the energy generated by the solar power device 3 to allow self consumption, and supplies the energy generated by the solar power device 3 to the power grid (reverse power flow) to sell power back to the power company. In addition, the power control device 4 sends the management device 1 data representing the amount of power generated by the solar power device 3 (power output); the amount of power supplied to the electrical appliance, and the amount of power supplied to the power grid (feed-in amount).

Although the management device 1 and the power control device 4 are separate in the example in FIG. 1, the management device 1 and the power control device 4 may be combined.

The power grid 2 is a system owned by the power company, and supplies an electrical appliance installed on-site at the consumer with energy. The power grid 2 is provided with a power meter 8a that measures the total amount of power supplied from the power grid 2 to the appliances (purchased amount) and a voltage meter 8b that measures the voltage of the power grid 2.

The power meter 8a sends to the management device 1 power data representing the purchased amount measured thereby. The voltage meter 8b sends to the management device 1 voltage data indicating the voltage setting the power grid 2 measured thereby.

The power storage device 5a converts the power supplied from the power grid 2 and the power control device 4 into chemical energy and stores the energy therein. The power storage device 5a also discharges the energy stored therein to other electrical appliances as needed. The water heater 5b uses the energy supplied from the power grid 2 and the power control device 4 to heat water. The refrigerator 5c uses the energy supplied from the power grid 2 and the power control device 4 to keep inside the refrigerator 5c at a predetermined temperature.

Each appliance is provided with power meter for measuring the amount of power that the appliance used (power consumed), and a physical quantity sensor for measuring a physical quantity indicating the state of the appliance. More specifically, the power storage device 5a is provided with a power meter 6a that measures the amount of power consumed in order to store power (energy conversion), and a power storage sensor 7a that measures the amount of energy stored in the power storage device 5a (power stored). The water heater 5b is provided with a power meter 6b that measures the amount of power consumed by the water heater 5b, and a temperature sensor 7b that measures the temperature of the water heated by the water heater 5b. The refrigerator 5c is provided with a power meter 6c for measuring the amount of power consumed by the refrigerator 5c, and a temperature sensor 7c for measuring the temperature inside the refrigerator 5c.

Each of the power meters 6a-6c sends the management device 1 power data representing the power consumption measured thereby. The power storage sensor 7a, the temperature sensor 7b, and the temperature sensor 7c each sends the management device 1 physical quantity data indicating the amount of power stored and the temperature respectively measured thereby.

Potential Usable Energy

As above described, a consumer may sell energy generated to the power grid 2. However, a set point is established as a threshold for the voltage of the power grid 2; energy cannot flow back into the power grid 2 when the voltage of the power grid 2 equals or exceeds the set point. That is, there is an upper limit value to the amount of power that may be sold (potential feed-in amount). Consequently, this may lead to potential usable energy, which cannot be consumed or sold when the power output equals or is greater than the total of the self-consumed power (below, the total power consumption for normal appliances) and the potential feed-in amount. Note that surplus energy refers to the energy output minus self-consumed energy, and unused energy refers to surplus energy minus potential usable energy.

Embodiments of the present invention address effective use of potential usable energy. More specifically, embodiments of the present invention compute the potential usable energy and determine an operation schedule for a designated appliance on the basis of a planned usage time and a continuous effective time for the designated appliance. Embodiments of the present invention are thus able to effectively use potential usable energy. Embodiments of the present invention also allow effective use of potential usable energy without introducing special devices such as storage batteries or the like (i.e., with less startup investment costs).

Here a designated appliance is an electrical appliance that operates by consuming the potential usable energy. Additionally, an electrical appliance a consumer operates as normal with no potential usable energy available is referred to as a normal appliance. A designated appliance may be different from a normal appliance or may the same as a normal appliance.

Note that while the aforementioned set point is a constant value, the voltage setting of the power grid 2 may fluctuate in accordance with, for instance, the purchased amount and feed-in amount from each of the consumers supplied energy by the power grid 2. That is, the potential feed-in amount is the amount of power corresponding to the voltage setting (i.e., the set point); however, the potential feed-in amount fluctuates in accordance with the purchased amount and the feed-in amount of each consumer.

Management Device Configuration

As illustrated in FIG. 1, the management device 1 is provided with a controller 11, a storage unit 12, and a communication unit 13. The management device 1 may also be provided with a display unit, an input unit, a voice input unit, a voice output unit or the like; however, these components are not illustrated as the same are unrelated to the features of the invention.

The communication unit 13 allows communication with other devices such as the power control device 4, the meters, and the like via wired or wireless communication, and exchanges data in accordance with commands from the controller 11. For instance, the communication unit 13 acquires power data, voltage data, and physical quantity data from the power control device 4 and the meters in accordance with commands from the controller 11.

The input unit 14 allows a user to enter command signals for the management device 1 to thereby operate the management device 1. The input unit 14 may be made up of input devices such as a keyboard, a mouse, a keypad, an input button, or the like. The input unit 14 may also be a remote control device such as a remote controller that is separate from the management device 1.

The controller 11 temporarily reads a program from the storage unit 12 into a temporary storage unit (not shown) and runs the program to thereby execute various computations, and provide overall control of all the components in the management device 1.

In the embodiment the controller 11 includes a data acquisition unit 21, an estimation unit 22, a potential usable power calculator 23, a scheduler 24 and an appliance controller 25 which are provided as function blocks therein. The function blocks in the controller 11 may be realized by a central processing unit (CPU) reading a program stored on a storage device implemented with a read-only memory (ROM) into a temporary storage unit implemented with a random-access memory (RAM), and running the program.

The data acquisition unit 21 acquires power data, voltage data, and physical quantity data from the power control device 4 and the meters through the communication unit 13. The data acquisition unit 21 outputs the power data, voltage data, and physical quantity data obtained thereby to the estimation unit 22 and the potential usable power calculator 23. The data acquisition unit 21 also stores the power data, voltage data, and physical quantity data obtained in the storage unit 12.

The data acquisition unit 21 may also acquire planned usage time data from an external device such as a user terminal). This planned usage time data indicates the time a user plans to use an electrical appliance (designated appliance). The data acquisition unit 21 outputs the planned usage time data obtained thereby to the scheduler 24.

The estimation unit 22 estimates the power output generated by the solar power device 3, the total power consumption of the normal appliances, and the power that may be sold (potential feed-in amount) within a predetermined period. The estimation unit 22 outputs the estimated values for the power output, the total power consumption, and potential feed-in amount to the potential usable power calculator 23.

Here the predetermined period may be any period such as 30 minutes, one hour, one day, or the like; or a period counted from the latest time.

The estimation unit 22 estimates the power output generated by the solar power device 3 within the predetermined period on the basis of, for instance, weather information indicating the temperature, humidity, atmospheric pressure, solar irradiance, and the like during that predetermined period. The estimation unit 22 may also estimate the power output generated by the solar power device 3 within a predetermined period on the basis of past or most recent power output or weather information. The estimation unit 22 may also estimate the power output generated by the solar power device 3 during a predetermined period on the basis of panel temperature in the solar power device 3, a physical quantity indicating the state of the solar power device 3, or a rated value for the solar power device 3. Finally, the estimation unit 22 may estimate the power output through a combination of the aforementioned criteria. In this case, for instance, the data acquisition unit 21 may acquire weather information from an external device (not shown) connected to the Internet via the communication unit 13, acquire physical quantity data from a physical quantity sensor (not shown) installed at the solar power device 3, and store the weather information and the physical quantity data in the storage unit 12.

The estimation unit 22 may also estimate a total power consumption for the normal appliances during a predetermined period on the basis of, for instance, past or most recent power consumption by the normal appliances. Here, the total power consumption estimated by the estimation unit 22 does not include the power consumption of a designated appliance. That is, the estimation unit 22 estimates the total power consumption as the total power consumption of the electrical appliances regularly operated by the consumer with no potential usable energy available. Therefore, the past or most recent power consumption data referenced by the estimation unit 22 is the power consumption data for normal appliances and does not include the power consumption of a designated appliance.

The estimation unit 22 may also estimate a potential feed-in amount during a predetermined period on the basis of, for instance, estimated values for the power output and the total power consumption during the predetermined period, as well as a set point.

The estimation unit 22 may also estimate when a user's planned usage time for an electrical appliance (designated appliance) on the basis of, for instance, the past or most recent power consumption of the normal appliances. The estimation unit 22 outputs the planned usage time data obtained thereby to the scheduler 24.

The management device 1 is not limited to being provided with the estimation unit 22 in the embodiment. For instance, the power control device 4 or another device on the Internet may estimate the power output, the total power consumption, the potential feed-in amount, and the like. In this case, the data acquisition unit 21 may acquire an estimated value for the power output, the total power consumption, the potential feed-in amount, and the like from the power control device 4 or the other device on the Internet via the communication unit 13. Additionally, when there is plurality of management devices 1, a first management device 1 may estimate values for the power output, the total power consumption, the potential feed-in amount, or the like, and a second management device 1 may obtain the estimated values from said first management device 1.

The potential usable power calculator 23 computes a measurement value or an estimated value for the potential usable power; here the potential usable power is the amount of power remaining after excluding the total power consumption of the normal appliances and the potential feed-in amount from the power output generated by the solar power device 3. The potential usable power calculator 23 outputs the measurement value or estimated value for the potential usable power computed thereby to the scheduler 24.

More specifically the potential usable power calculator 23 computes an estimated value for the potential usable power during a predetermined period by subtracting the estimated values for the total power consumption and the potential feed-in amount during the predetermined period from the estimated value for the power output during the predetermined period. The potential usable power calculator 23 also calculates a measurement value for the potential usable power during a predetermined period by subtracting the measurement values for the total power consumption and the potential feed-in amount during the period from the measurement value for the power output during the predetermined period.

The potential usable power calculator 23 may also compute a potential usable power period, i.e., a period when potential usable energy becomes available. The potential usable power calculator 23 may also specify a time-to-set-point which is the time the power output reaches power corresponding to the set point.

The potential usable power calculator 23 may update an estimated value previously computed for the potential usable power during a predetermined period, on the basis of at least any of the measurement values for power output, the total power consumption, and the feed-in amount.

As illustrated in FIG. 1, the potential usable power calculator 23 is provided with an assessment unit 26. The assessment unit 26 determines whether or not the difference between a current estimated value for the potential usable power computed by the potential usable power calculator 23 and a current measurement value for the potential usable power is greater than or equal to a predetermined value. The potential usable power calculator 23 updates subsequent estimated values for the potential usable power when the assessment unit 26 determines that the difference is greater than or equal to a predetermined value.

The management device 1 is not limited to being provided with a potential usable power calculator 23 in the embodiment. For example, the power control device 4 or another device on the Internet may compute the potential usable power. In this case, the data acquisition unit 21 may obtain the potential usable power from the power control device 4 or another device on the Internet via the communication unit 13. In addition, when there is a plurality of management devices 1, a first management device may calculate the potential usable power, and a second management device 1 may obtain the potential usable power computed from said first management device 1.

The scheduler 24 may determine an operation schedule that indicates at least the operation start time of a designated appliance so that one or a plurality of designated appliances may be operated using the potential usable power. The scheduler 24 outputs the operation schedule determined thereby to an appliance controller 25.

The scheduler 24 may determine an operation schedule that indicates at least any of an operation end time for the designated appliance, and operation period, and an output rate for the designated appliance in addition to the operation start time. For instance, if the designated appliance were a water heater, then the output rate would be the temperature of the water heated by the water heater; if the designated appliance were an air conditioner, then the output rate would be the temperature setting for the air conditioner.

As illustrated in FIG. 1, the scheduler 24 is provided with a planned usage determination unit 27, and an effective time determination unit 28. The planned usage determination unit 27 identifies a planned usage time a user plans to use a designated appliance; the effective time determination unit 28 identifies a continuous effective time when a physical quantity indicating a state that change due to the designated appliance using the potential usable power is within a range that is effective for the user of said designated appliance. In this case, the scheduler 24 may determine an operation schedule on the basis of a planned usage time and a continuous effective time for the designated appliance. Moreover, the scheduler 24 may determine an operation schedule for the user's planned usage time on the basis of additional power consumption required to ensure that a physical quantity representing the state that changes due to the designated appliance is within a range that is effective for the user.

The planned usage determination unit 27 may specify the planned usage time data that represents the planned usage time data obtained by the data acquisition unit 21 as the planned usage time a user plans to use the designated appliance. The planned usage determination unit 27 may specify the planned usage time estimated by the estimation unit 22 as the period a user plans to use the designated appliance. The planned usage determination unit 27 may specify the planned usage time the user enters via the input unit 14 as the time the user plans to use the designated appliance. Note that the planned usage time specified by the planned usage determination unit 27 may be a certain time (e.g., 6:00 pm.), or may be range of times (e.g., 6:00 pm to 7:00 pm).

The scheduler 24 may determine an operation schedule for a plurality of designated appliances where at least any of the power consumption and the period required for operation is different. The scheduler 24 may also determine an operation schedule that provides the maximum usage rate for the potential usable power.

The scheduler 24 may determine the operation schedule on the basis of a physical quantity indicating the state of the designated appliance. More specifically, the scheduler 24 may determine at least any of the power and the period required to operate the designated appliance on the basis of a physical quantity indicating the state of the designated appliance, and determine an operation schedule for said designated appliance.

The management device 1 is not limited to being provided with the scheduler 24 in the embodiment. For example, the power control device 4 or another device on the Internet may determine the operation schedule. In this case, the data acquisition unit 21 may obtain the operation schedule from the power control device 4 or another device on the Internet via the communication unit 13. In addition, when there is a plurality of management devices 1, a first management device may determine an operation schedule, and a second management device 1 may obtain the operation schedule determined from said first management device 1.

The appliance controller 25 may operates the designated appliance on the basis of the operation schedule. More specifically, the appliance controller 25 transmits a control signal via the communication unit 13 to the designated appliance; the control signal controls the operation start, the operation termination, and the output rate of the designated appliance.

The storage unit 12 stores programs or data referenced by the controller 11; for example, the storage unit 12 may store power data 31, voltage data 32, physical quantity data 33, and the like. Thus, past power output, power consumption, purchased amount, feed-in amount, and the voltage setting of the power grid 2, as well as physical quantities related to the appliances and the like may be stored in the storage unit 12 as power data 31, voltage data 32, and physical quantity data 33. Therefore, the estimation unit 22, potential usable power calculator 23, and the scheduler 24 may reference this data.

Processes in the Management Device
Determining the Operation Schedule

Figure 2:
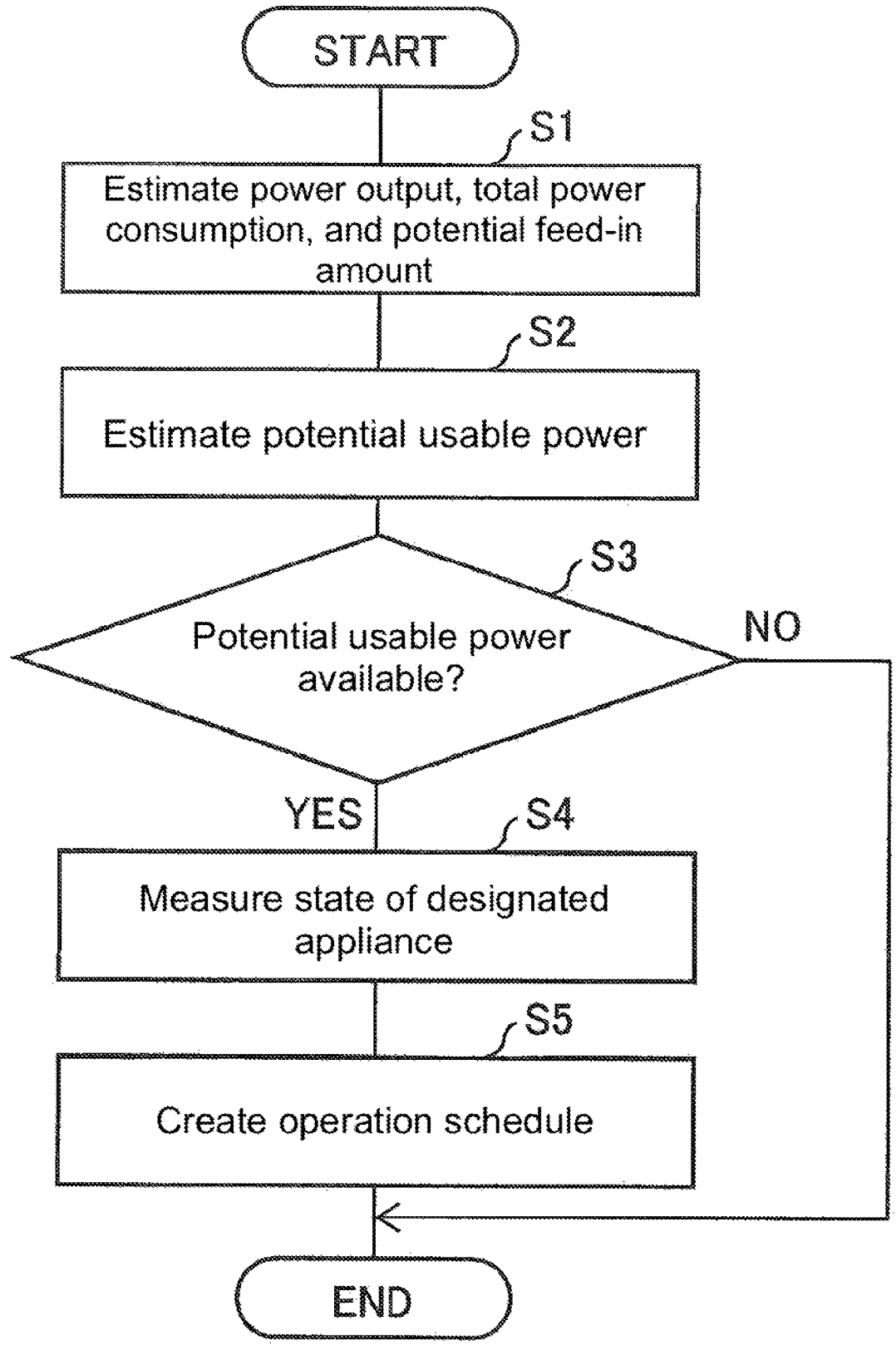
FIG. 2 is a flowchart illustrating an example of an operation schedule determination process run by the management device.

The process of determining an operation schedule carried out by the management device 1 is described on the basis of FIG. 2. FIG. 2 is a flowchart illustrating an example of an operation schedule determination process run by the management device 1; In this example, the potential usable energy available during a predetermined period (e.g., one day) is estimated and an operation schedule determined in advance for the potential usable power period.

As illustrated in FIG. 2, the estimation unit 22 estimates the power output, the total power consumption, and the potential feed-in amount (Si). The potential usable power calculator 23 estimates the potential usable power on the basis of the estimated values for power output, the total power consumption, and the potential feed-in amount determined by the estimation unit 22 (S2: potential usable power computation step).

If at this point potential usable energy is available (YES at S3), the data acquisition unit 21 obtains physical quantity data from a physical quantity sensor that measures a physical quantity indicating the state of a designated appliance (S4). The scheduler 24 references the physical quantity data obtained by the data acquisition unit 21, takes into account the status of the designated appliance, and determines an operation schedule (S5: schedule determination step).

Note that if no potential usable energy is available (NO at S3), the management device 1 does not create an operation schedule and ends the operation schedule determination process.

Updating the Operation Schedule

Figure 3:
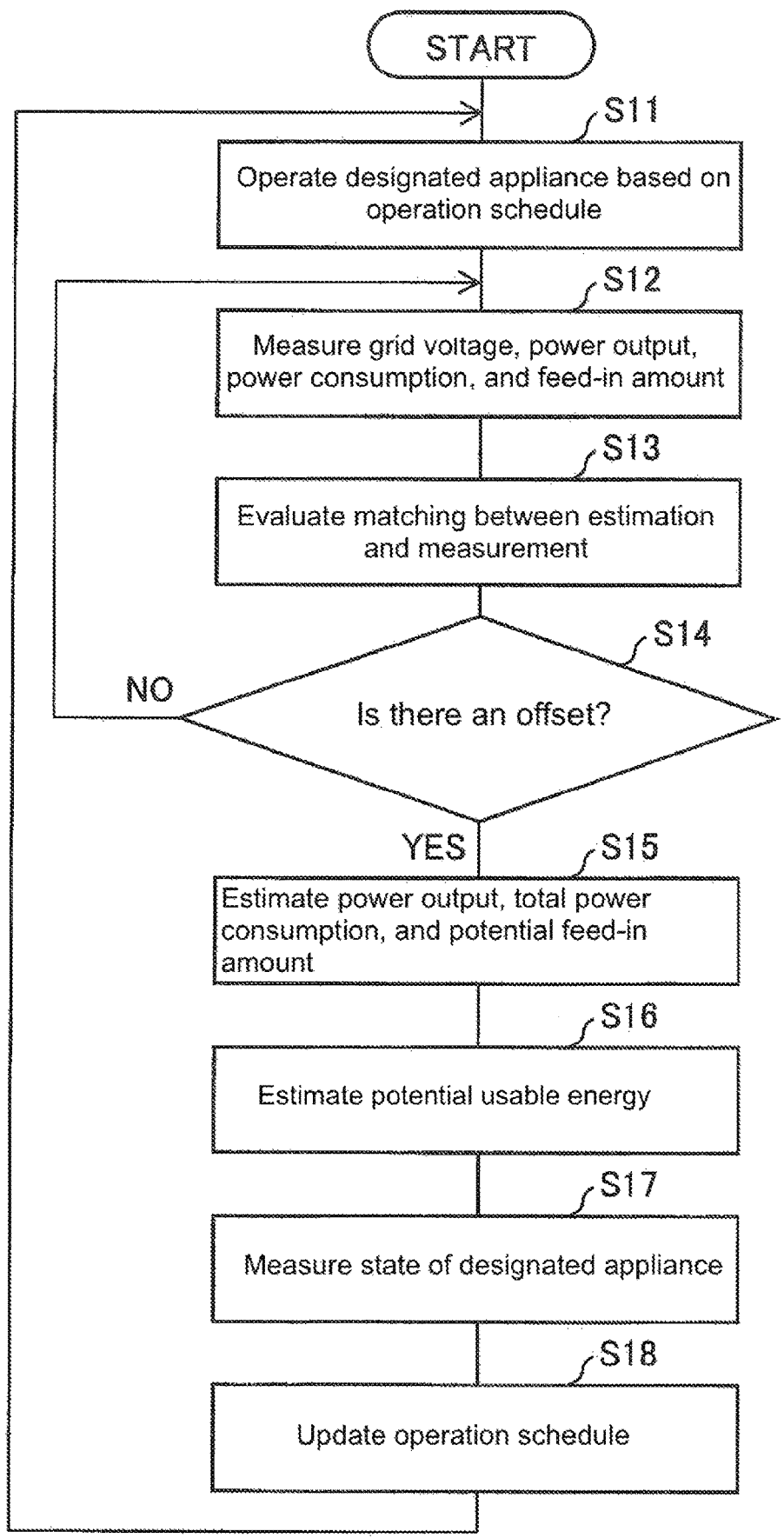
FIG. 3 is a flowchart illustrating an example of the operation schedule updating process run by the management device.

The process of updating an operation schedule carried out by the management device 1 is described on the basis of FIG. 3. FIG. 3 is a flowchart illustrating an example of an operation schedule updating process run by the management device 1; in this example the management device updates the operation schedule in real time while the designated appliance is operating.

As illustrated in FIG. 3, the appliance controller 25 operates the designated appliance on the basis of an operation schedule created in advance by the scheduler 24 (S11). At this point, the data acquisition unit 21 acquires voltage data indicating the most recent voltage setting on the power grid, as well as power data representing the latest power output, power consumption, and feed-in amount (S12). The potential usable power calculator 23 calculates a new measurement value for the most recent potential usable power on the basis of data representing the most recent measurement value obtained by the data acquisition unit 21. The assessment unit 26 calculates the difference between the estimated value for the potential usable power calculated for this period in advance, and the new measurement value for the potential usable power (S13).

The flow returns to S12 if the difference calculated by the assessment unit 26 is below a predetermined value (NO at S14).

In contrast, if the difference calculated by the assessment unit 26 is greater than or equal to the predetermined value (YES at S14), i.e., if there is an offset between the estimated value and the measurement value, the estimation unit 22 takes into account the most recent measurement values for the power output, total power consumption, and potential feed-in amount, to estimate a power output, a total power consumption, and a potential feed-in amount (S15). The potential usable power calculator 23 estimates the potential usable power on the basis of the estimated values for the power output, the total power consumption, and the potential feed-in amount determined by the estimation unit 22 (S16).

Subsequently, the data acquisition unit 21 obtains physical quantity data from a physical quantity sensor that measures a physical quantity indicating the state of a designated appliance (S17). The scheduler 24 determines a new operation schedule on the basis of the potential usable power estimated by the potential usable power calculator 23 in S16 and the physical quantity data obtained by the data acquisition unit 21, and updates a previously created operation schedule (S18).

The appliance controller 25 operates the designated appliance on the basis of the operation schedule updated by the scheduler 24 (S11).

Types of Designated Electrical Appliances

Figure 4:
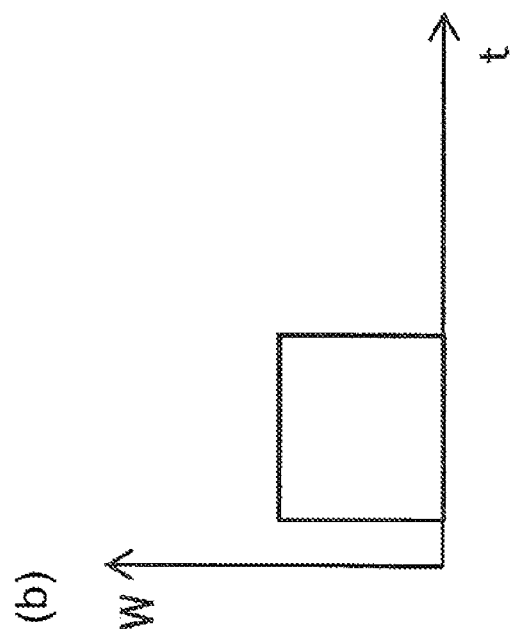
FIG. 4 illustrates an example of a power requirement and time requirement for a designated appliance.
Figure 4:
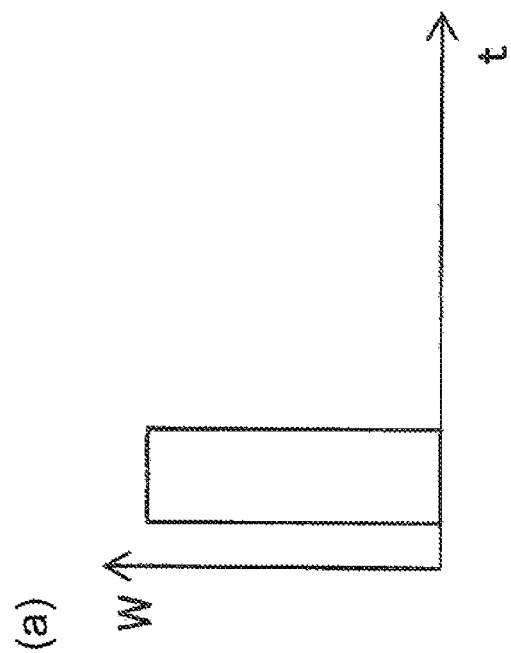
Figure 4:
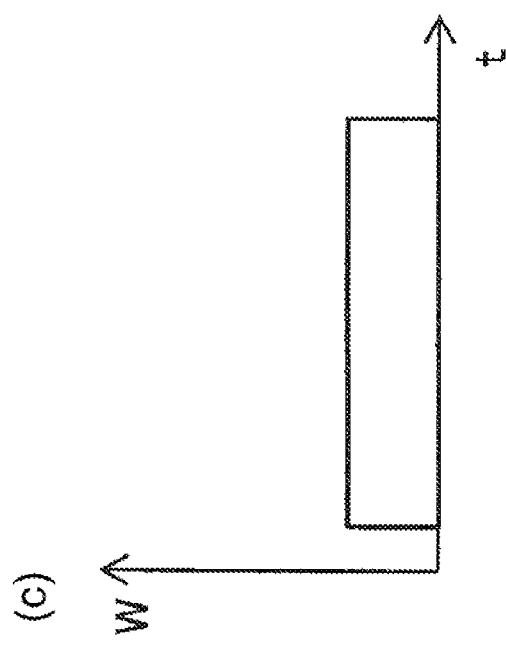

The types of designated appliances are described on the basis of FIG. 4. FIG. 4(a) through FIG. 4(c) illustrate examples of a power consumption requirement and a time requirement for a designated appliance. The Y-axis and the X-axis in the graphs represent the power consumption and the time respectively in FIG. 4(a) through FIG. 4(c).

There are various types of designated appliances, and each of these types require various amounts of power consumption (power requirement) and time (time requirement) to operate. The designated appliance illustrated in FIG. 4A requires a lot of energy for a short time. A designated appliance may be a water heater, a microwave oven, a fast charger, or the like. The designated appliance illustrated in FIG. 4B requires a moderate amount of energy for a fixed time. For example, these may be storage batteries, washing machines, or the like. The designated appliance illustrated in FIG. 4C requires relatively little energy over a long period. For example, lighting appliances, televisions, music players or the like.

Thus, designated appliances have various power requirements and time requirements. The scheduler 24 may therefore determine an operation schedule that takes these requirements into account to provide a maximum use rate for the potential usable energy. Specific examples thereof are described below.

FIRST EXAMPLE

Figure 5:
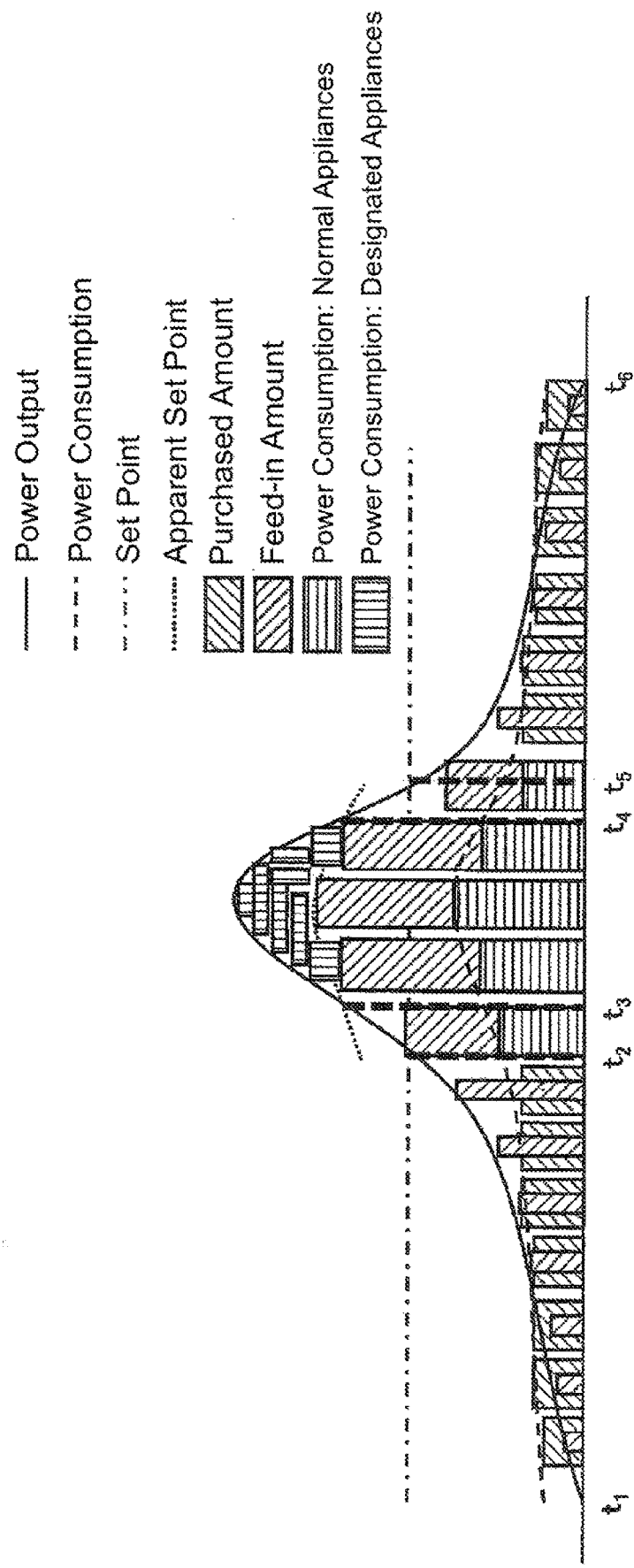
FIG. 5 illustrates an example of a destination for the energy output when the power selling price is greater than the power purchase price.

An operation schedule created by a management device 1 according to embodiments of the invention is described on the basis of FIG. 5. The first example describes a case where the power selling price is greater than the power purchase price per unit power. The first example also illustrates an operation schedule created upon estimating the potential usable power for a one-day period. FIG. 5 is also an example of a destination for the energy output when the power selling price is greater than the power purchase price.

As illustrated in FIG. 5 all the energy generated between the time t1 to time t2 and time t5 to time t6 is sold to maximize the power selling price since the power output does not exceed the power corresponding to the set point. Additionally, the energy consumed by normal appliances between the time t1 to time t2 and time t5 to time t6 can be covered by the power purchased from the power grid 2.

However, all the energy generated between the time t2 to time t5 cannot be sold because the power output equals or exceeds the power corresponding to the set point. Therefore, the energy that remains after removing the potential feed-in amount from the power output is used to operate normal appliances through self consumption.

Although the maximum amount of energy is sold and normal appliances use the energy generated through self consumption some energy remains between the time t3 to time t4. That is, between time t3 to time t4 is a potential usable power period where potential usable energy is available.

Therefore, the scheduler 24 creates an operation schedule that provides the maximum usage rate for the potential usable energy (FIG. 5). More specifically, the scheduler 24 determines the operation start time and operation end time for the three types of designated appliances (FIG. 4) so that graphs do not fall outside the power output curve.

SECOND WORKING EXAMPLE

Figure 6:
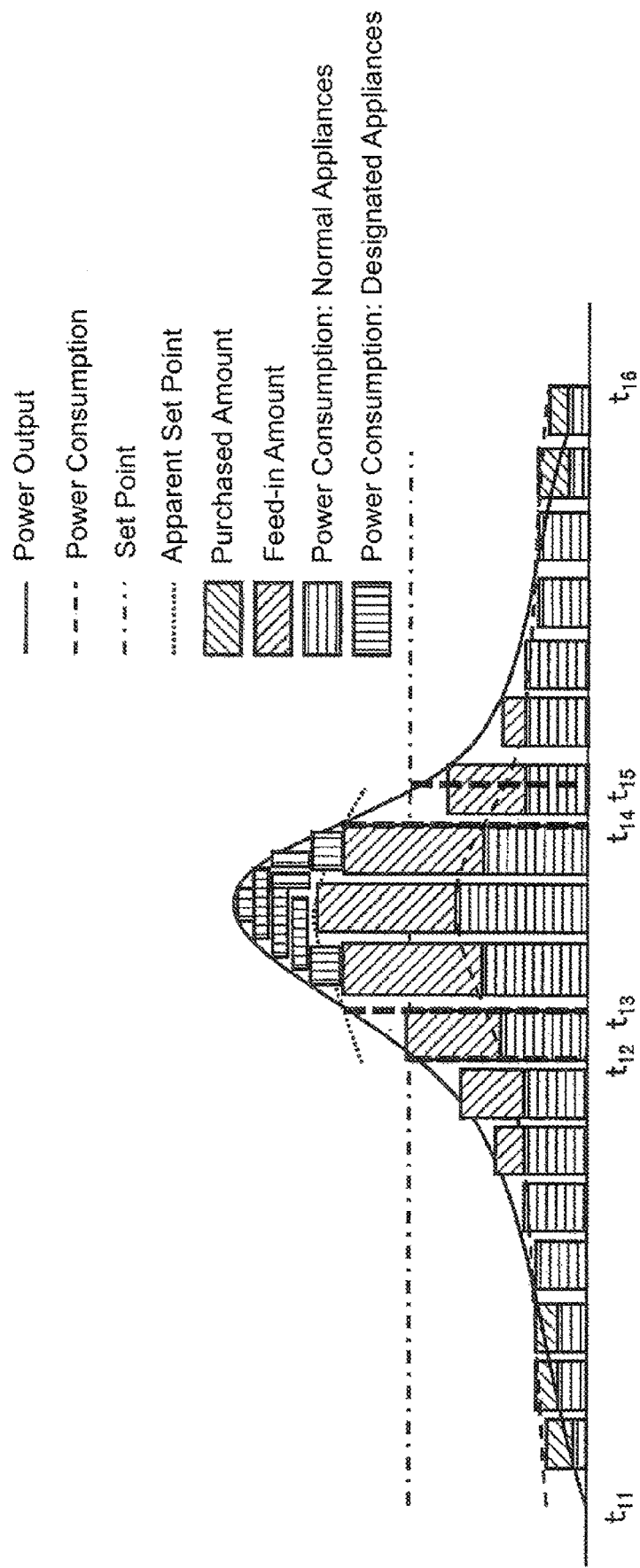
FIG. 6 illustrates an example of energy output when the power purchase price is greater than the power selling price.

An operation schedule created by a management device 1 according to embodiments of the invention is described on the basis of FIG. 6. The second example describes a case in which the power purchase price is greater than the power selling price per unit power. The second example also illustrates an operation schedule created upon estimating the potential usable power for a one-day period. FIG. 6 illustrates an example of energy output when the power purchase price is greater than the power selling price.

As illustrated in FIG. 5 the energy generated between the time t11 to time t12 and time t15 to time t16 is used to operate normal appliances and thus self consumed to minimize the power purchase price since the power output does not exceed the power corresponding to the set point. If the power output is less than the total power consumption of the normal instrument, then the gap energy is bought from the power grid 2. In contrast, if the power output is greater than the total power consumption of the normal instruments, then the excess energy is sold.

The energy generated between the time t12 to time t13 and between the time t14 to time t15 is used to operate normal appliances because the power output does not exceed the power corresponding to the apparent set point when taking self consumption into account. The excess energy is sold.

Although the maximum amount of excess energy is sold and normal appliances use the energy generated through self consumption some energy remains between the time t13 to time t14. That is, between the time t13 to time t14 is a potential usable power period where potential usable energy is available.

Therefore, the scheduler 24 creates an operation schedule that provides the maximum usage rate for the potential usable energy (FIG. 6). More specifically, the scheduler 24 determines the operation start time and operation end time for the three types of designated appliances (FIG. 4) so that graphs do not fall outside the power output curve.

As illustrated in the first and second examples, the management device 1 is capable of effectively making use of potential usable energy. It is thus possible to provide a consumer with cost savings on electricity. The management device 1 also operates a designated appliance automatically, eliminating the inconvenience to the consumer. Additionally, the system maintains the stability of the power grid 2 because power is not fed-in at greater than the set point.

The Continuous Effective Time

The designated appliances that use the potential usable energy to operate are not the electrical appliances originally slated for operation during the potential usable power period (i.e., these designated appliances are not electrical appliances that a user uses during the potential usable power period). Therefore, a designated appliance is preferably able to extend the benefit of using the potential usable energy. This kind of designated appliance may be a water heater 5b, a power storage device 5a, an air conditioner or the like.

Figure 7:
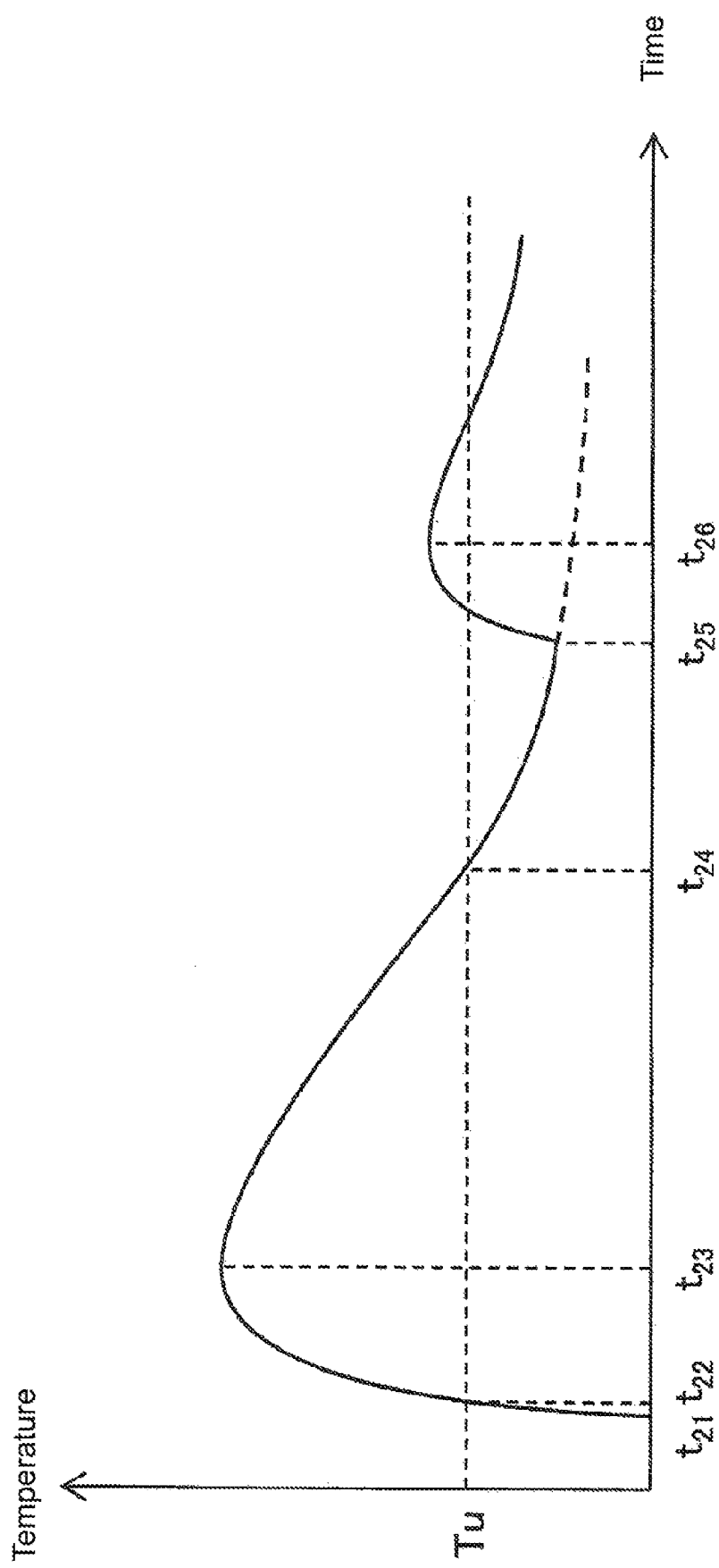
FIG. 7 is a graph representing the relationship between the temperature of water generated by a water heater and the time elapsed.

A specific description of the continuous effective time is given on the basis of FIG. 7 with a water heater 5b as an example. FIG. 7 depicts a relationship between the temperature of water generated by a water heater 5b and the time elapsed. The vertical axis of the graph in FIG. 7 is the water temperature, and the horizontal axis is the time elapsed. Here the temperature the user sets for the water heater 5b is assumed as a temperature setting Tu.

The water heater 5b uses the potential usable energy during a period from the time t21 to time t23 to generate water of a predetermined temperature. However, as illustrated in FIG. 7 the temperature of the water in the water heater 5b decreases over time due to natural thermal radiation. The temperature of the water in the water heater 5b decreases to the user's temperature setting Tu at the time t24. It is sometime after the time t23 when the user can no longer use water at the temperature setting Tu because the water temperature falls below the temperature setting Tu.

Therefore, the user may use water at the temperature setting Tu up until the time t24 without needing to operate the water heater 5b again. In other words, the period wherein the user can effectively use the water heater 5b, i.e., continuous effective time, is from a time t22 when the water heater 5b uses the potential usable energy to generate water at a temperature exceeding the temperature setting Tu until the time t24 when the water temperature falls below the temperature setting Tu; this is the period during which the temperature of the water in the water heater 5b is no less than the temperature setting Tu. Therefore, as long as it is during the continuous effective time the user can use water at the temperature setting Tu without needing to operate the water heater 5b again.

As above mentioned the state of the designated appliance that changes when the designated appliance uses the potential usable power can be expressed as a physical quantity. In the case of the water heater 5b, this physical quantity is the temperature of the water in the water heater 5b and the effective range for the user using the designated appliance is the range where the water temperature is greater than or equal to the temperature setting Tu.

However, the user must activate the water heater 5b again if the user wishes to use the water heater 5b beyond the time t24. For instance, when the user wishes to use heated water at a time t26, the user must activate the water heater 5b at a time t25 prior to the user usage time t26 to increase the water temperature. That is, additional energy must be consumed to operate the water heater 5*b* in order for the temperature of water in the water heater 5*b* to be greater than or equal to the temperature setting Tu at the user usage time t26. This added power consumption is required to ensure that the physical quantity representing the state that changes due to the designated appliance is within a range that is effective for the user when the user plans to use the designated appliance.

While this description is given with a water heater 5*b* as an example, the situation is identical for a power storage device 5*a*, an air conditioner, or the like. Again, the state of the designated appliance that changes when the designated appliance uses the potential usable power can be expressed as a physical quantity. In the case of power storage device 5*a*, the physical quantity is the energy stored in the power storage device 5*a* and the effective range for the user using the designated appliance is a range that is greater than or equal to the amount of power to be stored which is set by the user. In the case of an air conditioner, the physical quantity is the temperature of a prescribed space regulated by the air conditioner and the effective range for the user using the designated appliance is temperature range which is set by the user.

Techniques for Identifying the Continuous Effective Time

Next, the specific techniques employed by the effective time determination unit 28 to determine the continuous effective time are described. This description also uses the water heater 5*b* as an example.

First, a basic equation 1 for heat transfer (i.e., natural thermal radiation) is provided below. In Equation 1, E is the amount of heat transfer per unit time (J/s); k is the thermal conduction rate (1/JsKm); A is the surface area (m2) of the water heater 5*b;* d is the thickness (m) of the heat insulating material in the water heater 5*b;* T(t) is the temperature (° C.) of water in the water heater 5*b* at time t; and Ta(t) is the ambient temperature (° C.) at time t. Note that Equation 1 does not take into account any effects from wind (i.e., convection of the open air).

Equation 1

$$E = \frac{kA}{d}(T(t) - Ta(t)) \quad (1)$$

The water heater 5*b* does not change in Equation 1, therefore taking kA/d as a constant α yields the following Equation 2.

Equation 2

$$E = \alpha(T(t) - Ta(t)) \quad (2)$$

If unknown, α can be calculated from past data on the basis of Equation 2. The ambient temperature Ta(t) may be obtained from temperature forecast information such as a general purpose weather information site, or the like, and the forecast air temperature indicated by the forecast air temperature information taken as the ambient temperature Ta(t). Here, the amount of heat transfer E per unit time may be obtained from Equation 2 when the temperature T(t) of the water in the water heater 5*b* at a certain time t is known.

The amount of heat transfer E computed may be used to compute the water temperature T(t+1) in the water heater 5*b* at time t+1 based on the following Equation 3. In Equation 3, Q is the heating value (J), M is the capacity (kg) of the water heater 5*b*, and C is the specific heat (J/kg° C.).

Equation 3

$$Q = MC(T(t+1) - T(t)) \quad (3)$$

Thus, the temperature of the water in the water heater 5*b* may be estimated using Equation 2 and Equation 3. Estimating the change in temperature of the water in the water heater 5*b* makes it possible to specify when the temperature is the user's temperature setting Tu, and thus makes it possible to specify the continuous effective time of the water heater 5*b*. It may not be possible to specify when, using the potential usable energy, the temperature of the water in the water heater 5*b* will exceed the temperature setting Tu; in this case, the continuous effective time may start at the time the water heater 5*b* no longer operates using the potential usable energy (i.e., at the operation end time).

Figure 8:
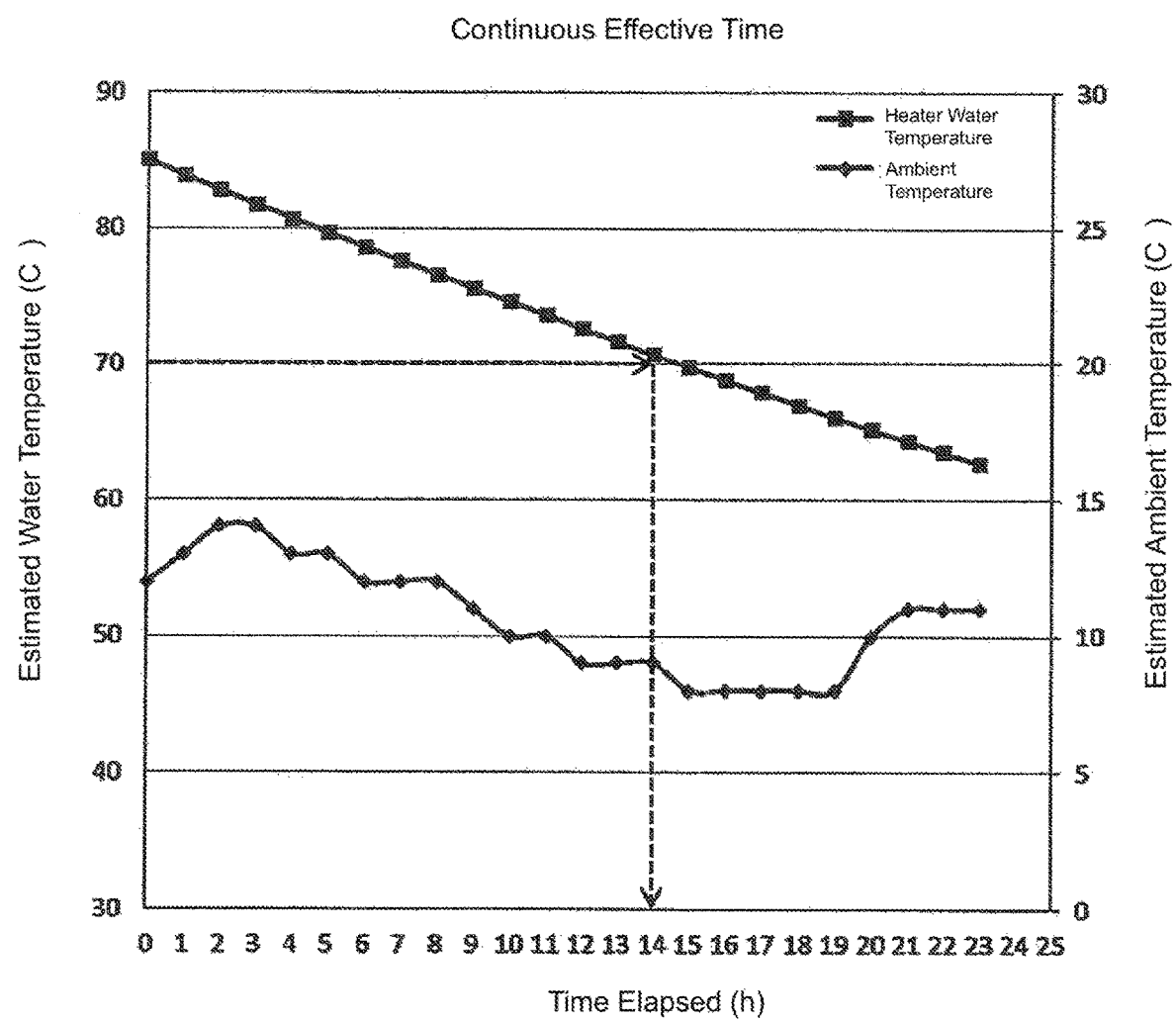
FIG. 8 is a graph of estimated water temperature in a water heater and the estimated ambient temperature.

A more concrete example of specifying the continuous effective time is described on the basis of FIG. 8. FIG. 8 is a graph of estimated water temperature in the water heater 5*b* and the estimated ambient temperature. In FIG. 8 the left vertical axis represents the estimated water temperature, and the right vertical axis represents the estimated ambient temperature; the horizontal axis is the time elapsed since an operation ended where the water heater 5*b* used the potential usable energy (operation end time).

Here it is assumed that during normal use the water temperature in water heater 5*b* falls one degree Celsius (1° C.) in one hour, and the constant α is computed based on this condition. It is also assumed that the capacity of the water heater 5*b* is 370 liters. It is further assumed that the water heater 5*b* is operated using the potential usable energy and that the water temperature in the water heater 5*b* is 85° C. at the operation end time for the water heater 5*b*. Finally, it is assumed that the temperature setting of the water heater 5*b* is 70° C.

Computing the estimated water temperature each hour from these criteria using the Equations 2 and 3 yields the graph depicted in FIG. 8. From the graph it can be determined that it takes fourteen hours from the operation end time for the water temperature to reach the temperature setting of 70° C.

Although the example given is of a water heater 5*b*, the same technique may be used compute the change in the amount of power stored, the temperature change in a space, and the like for a power storage device 5*a*, an air conditioner, and the like to thereby specify a continuous effective time.

While the graph of the estimated water temperature depicted in FIG. 8 appears linear, the graph is actually non-linear and dependent on the ambient temperature as can be understood from the Equations 2 and 3.

THIRD EXAMPLE

As above described, the scheduler 24 may determine the continuous effective time for a designated appliance, and create an operation schedule on the basis of a continuous effective time. More specifically, the scheduler 24 may determine an operation schedule so that a designated appliance having a continuous effective time uses the potential usable energy to operate without allowing an electrical appliance that does not have a continuous effective time to operate. An electrical appliance that does not have a continuous effective time may be, for instance, an electrical appliance that is only beneficial while consuming energy, such as, a television or lighting. The scheduler 24 may also determine an operation schedule that gives a priority for using the potential usable energy to a designated appliance that has a longer continuous effective time.

The scheduler 24 may create an operation schedule that prioritizes a designated appliance that has no limit on the continuous effective time therefor over a designated appliance that has a limit on the continuous effective time therefor. The scheduler 24 may also create an operation schedule that prioritizes a designated appliance that has a limit on the continuous effective time therefor over a designated appliance that has no limit on the continuous effective time therefor. A designated appliance with no limit on the continuous effective time therefor provides some benefit to the user regardless of when the designated appliance is operated; for instance, an automatic vacuum cleaner, a washing machine, a dryer, a rechargeable battery in an electrical appliance (e.g., a smartphone or an electric shaver), or the like.

The scheduler 24 may create an operation schedule on the basis of a relationship between the continuous effective time of a designated appliance and when the user plans to use said designated appliance (planned usage time). More specifically, the scheduler 24 may determine an operation schedule so that a designated appliance with a continuous effective time during the user's planned usage time uses the potential usable energy to operate while not allowing an electrical appliance with a continuous effective time outside the user's planned usage time to operate. The scheduler 24 may also create an operation schedule that places the highest priority on operating a designated appliance with a continuous effective time within the user's planned usage time, and prioritizes operating a designated appliance with a short time between the end of the continuous effective time therefor until the user's planned usage time.

The scheduler 24 may also determine an operation schedule for the user's planned usage time on the basis of additional power consumption required to ensure that the physical quantity representing the state that changes due to the designated appliance is within a range that is effective for the user. More specifically, the scheduler 24 may create an operation schedule so that a designated appliance not requiring additional power consumption uses the potential usable power to operate (i.e., a designated appliance with an additional power consumption of zero and in other words is slated for use during the continuous effective time therefor), without allowing an electrical appliance that requires additional power consumption to operate. The scheduler 24 may also determine an operation schedule that gives a priority for using the potential usable energy to a designated appliance that consumes less additional power.

The scheduler 24 may determine an operation schedule that provides the maximum usage rate for the potential usable power in the aforementioned example. An example of a specific process for determining an operation schedule is described below. The scheduler 24 establishes the following priority and determines an operation schedule that operates appliances in descending order of priority and maximizes the use of the potential usable power available. The scheduler 24 prioritizes appliances in order of (1) appliances with a continuous effective time; (2) appliances where the user's planned usage time is during the continuous effective time of the appliance; and (3) appliances with a small amount of additional power consumption.

Figure 9:
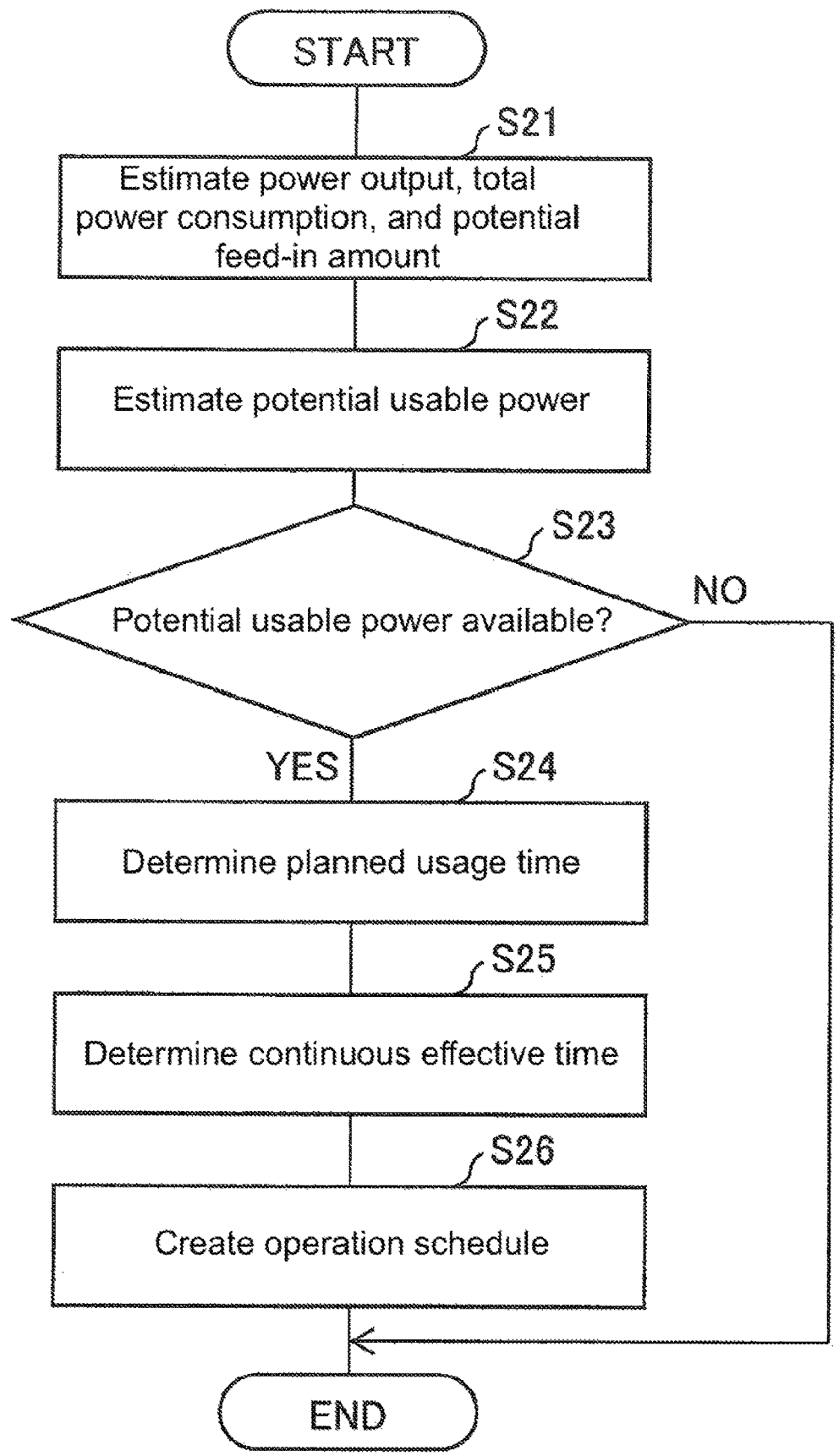
FIG. 9 is a flowchart illustrating another example of an operation schedule determination process run by the management device.

The process of determining an operation schedule carried out by the management device 1 of this example is described on the basis of FIG. 9. FIG. 9 is a flowchart illustrating an example of an operation schedule determination process run by the management device 1.

As illustrated in FIG. 9, the estimation unit 22 estimates the power output, the total power consumption, and the potential feed-in amount (S21). The potential usable power calculator 23 estimates the potential usable power on the basis of the estimated values for the power output, the total power consumption, and the potential feed-in amount determined by the estimation unit 22 (S22: potential usable power computation step).

If potential usable energy is available (YES at S23), the planned usage determination unit 27 identifies a user's planned usage time for the designated appliance (S24: planned usage time determination step). The effective time determination unit 28 then identifies the continuous effective time for the designated appliance (S25: continuous effective time determination step). The scheduler 24 creates an operation schedule for the designated appliance on the basis of the planned usage time and the continuous effective time.

Note that if no instance of potential usable energy is available (NO at S23), the management device 1 does not create an operation schedule and ends the operation schedule determination process.

Example of Implementation in Software

The control block (and in particular the controller 11) in the management device 1 may be implemented as logic circuits (hardware) created on an integrated circuit (IC chip) or the like, or maybe implemented in software by using a CPU.

When implemented in software, the management device 1 is provided with, for instance, a CPU that runs commands in a program that is software implementing each of the functions; a ROM or a storage device (referred to as recording medium) on which the aforementioned program and various data are recorded in a manner that can be read by a computer (or CPU); and RAM onto which the aforementioned program may be loaded. The objectives of the present invention can be met through the computer (or CPU) reading and executing the aforementioned program from the aforementioned recording medium. The aforementioned recording medium may be a non-transitory physical medium such as a tape, disc, card, semiconductor memory, or programmable logic circuit. The aforementioned program may also be supplied to the computer via any desired transmission medium capable of transferring the program (for example, a communication network, or broadcast waves). Finally, embodiments of the invention may also be implemented in the form of data signals encapsulated in carrier waves that are realized through the electronic transmission of the aforementioned program. The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

Other Embodiments

Here ends the description of embodiments of the invention; the invention is not limited to the above mentioned embodiments, and may be modified in various ways insofar as the modifications do not depart from the spirit and scope of the invention.

(A)

The above described embodiments provide examples of a management device 1 managing the power generator (solar power device 3) and the appliances (power storage device 5a, water heater 5b, and refrigerator 5c) owned by a single consumer. However, the present invention is not limited to this configuration.

Figure 10:
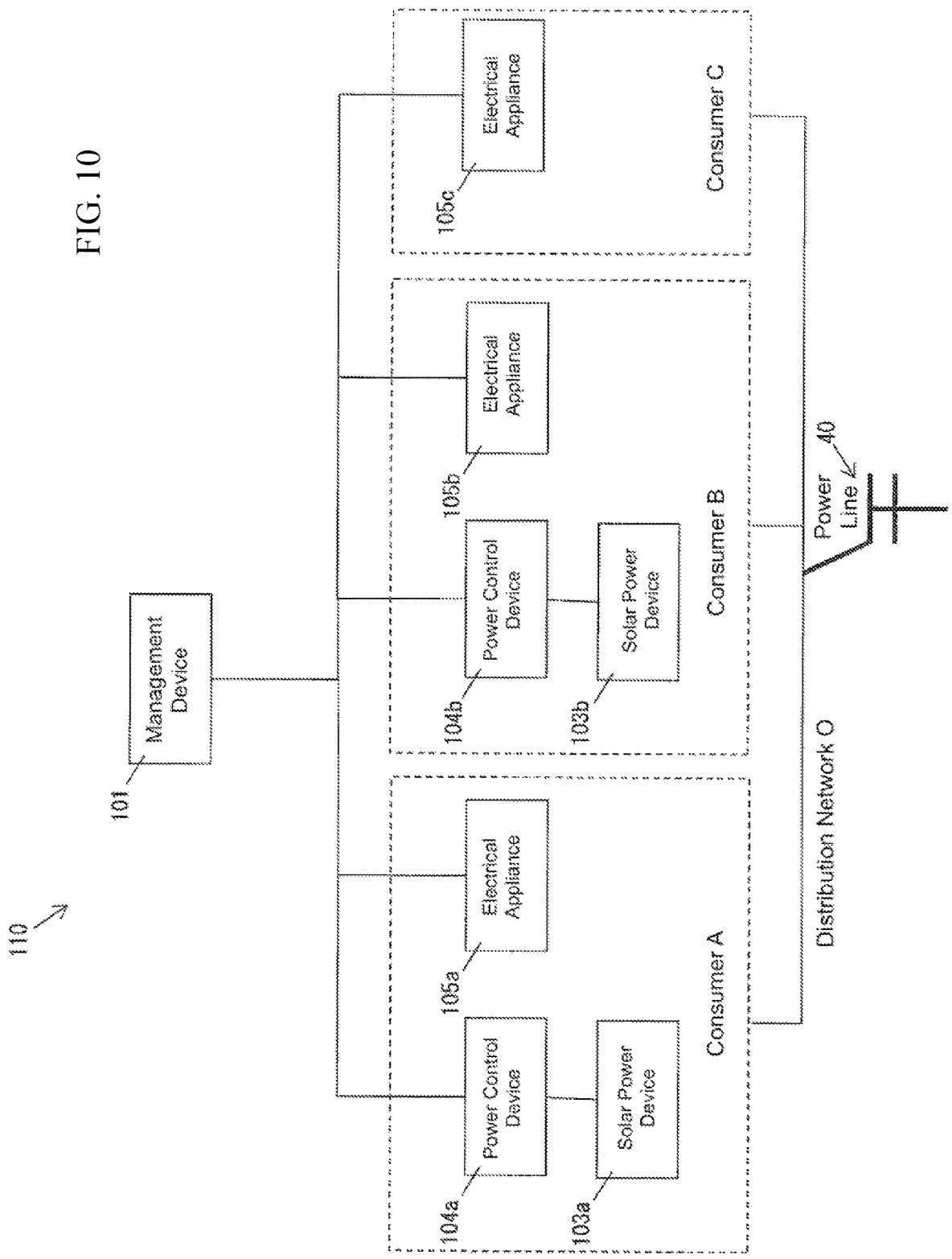
FIG. 10 is a block diagram illustration a configuration of a management system including a management device according to another embodiment of the invention.

For example, as illustrated in FIG. 10, the present invention may be implemented as a management system 110 containing a management device 101 that manages power generators 103a, 103b and/or appliances 105a-105c that are scattered among a plurality of consumers, Consumers A through C.

The management device 101 possesses the same configuration as the management device 1 in the above-mentioned embodiments; that is, the management device 101 includes a controller 11, a storage unit 12, a communication unit 13, an input unit 14, and the like.

Consumer A owns a power generator 103a, a power control device 104a, and an electrical appliance 105a. Consumer B owns a power generator 103b, a power control device 104b, and an electrical appliance 105b. Consumer C does not own a power generator and does not own a power control device, and owns only the electrical appliance 105C.

In this case, the surplus energy (and potential usable energy) may be flexibly shared among the multiple Consumers A through C connected via the shared distribution network O.

When routing surplus energy (potential usable energy) among the multiple consumers, Consumers A through C, for example, the surplus energy (potential usable energy) created at one consumer, i.e., Consumer A may be supplied to the appliances 105b, 105c owned by multiple consumers, i.e., Consumers B, C.

Moreover, when selecting the consumer that will be supplied power by a consumer that has generated surplus energy (potential usable energy), the controller 11 (i.e., the scheduler 24) preferably takes into account any power distribution loss that may occur when distributing power and selects where to supply power.

Hereby, for instance, it is possible to exclude consumers that are connected on a different distribution network that would create a large distribution power loss during power distribution, and select where to supply the surplus energy (potential usable energy).

Note the plurality of consumers, i.e., Consumers A through C, may own various kinds of power generators, for instance, generators that make use of natural energy such as a solar power device, wind power device, geothermal power device or the like, or may own electric generators, binary cycle power generators, or the like.

Additionally, the plurality of consumers, i.e., Consumers A through C, may own various kinds of appliances such as a power storage device, water heater, refrigerator, air conditioner (air conditioning device), electric car, illumination device, washing machine, television set, or the like.

(B)

In the above embodiments, the storage unit 12, which stores various data such as the power data 31, the voltage data 32, and the physical quantity data 33, is built into the management device 1. However, the present invention is not limited to this configuration.

The various data may be stored outside the management device on a server, in the cloud, or the like for example. The same may be implemented for the system configuration illustrated in FIG. 10.

INDUSTRIAL APPLICABILITY

The present invention may be adopted in a management device that manages a power generator and an electrical appliance.

REFERENCE NUMERALS

1 Management device
2 Power grid
3 Solar Power Device (Power Generator)
4 Power control device
5a Power storage device (electrical appliance)
5b Water heater (electrical appliance)
5c Refrigerator (electrical appliance)
6a-6c, 8a Power Meter
7a Power storage sensor
7b, 7c Temperature sensor
8b Voltage meter
10 Management system
21 Data acquisition unit
22 Estimation unit
23 Potential usable power calculator
24 Scheduler
25 Appliance controller
26 Assessment unit
27 Planned usage determination unit
28 Effective time determination unit
101 Management device
103a, 103b Solar power device
104a, 104b Power control device
105a-105c Appliance
110 Management system

The invention claimed is:

1. A management device configured to manage a power generator, a normal appliance, and a designated appliance, the management device comprising a processor configured with a program to perform operations comprising:
    operation as a potential usable power calculator configured to compute an estimated value of a potential usable power, the potential usable power comprising power received from the power generator excluding power consumption of the normal appliance and a feed-in amount of power capable of being sold;
    operation as a planned usage determination unit configured to identify a planned usage time for the designated appliance;
    operation as an effective time determination unit configured to identify, based on the estimated value of the potential usable power, a continuous effective time in which a physical quantity changed by the designated appliance using the potential usable power is effective; and
    operation as a scheduler configured to create an operation schedule indicating at least an operation start time for the designated appliance, such that the designated appliance is operated using the potential usable power, based on: the planned usage time, the estimated value of the potential usable power, and the continuous effective time;
    wherein the processor is configured with the program such that the potential usable power calculator computes the estimated value of the potential usable power during a predetermined period by subtracting an estimated value of the power consumption of the normal appliance during the predetermined period and an estimated value of the feed-in amount of power during the predetermined period from an estimated value of the power received from the power generator during the predetermined period.

2. The management device according to claim 1, wherein the processor is configured with the program to perform operations further comprising:
    operation as a data acquisition unit configured to acquire power data from a meter, the power data representing a measurement value for at least any of the power received from the power generator, the power consumption of the normal appliance, and a feed-in amount of power; and operation as the potential usable power calculator such that the potential usable power calculator updates the estimated value for the potential usable power during the predetermined period based on the power data.

3. The management device according to claim 2, wherein:

the processor is configured with the program such that:

operation as the data acquisition unit comprises operation as the data acquisition unit that acquires the power data from a meter representing measurement values for the power received from the power generator, the power consumption of the normal appliance, and the feed-in amount of power; and operation as the potential usable power calculator comprises operation as the potential usable power calculator that computes a measurement value for the potential usable power by subtracting a measurement value for the power consumption of the normal appliance and a measurement value for the feed-in amount of power from a measurement value for the power received from the power generator; and the processor is configured with the program to perform operations further comprising:

operation as an assessment unit configured to determine whether or not the difference between the estimated value and the measurement value for the potential usable power is greater than or equal to a predetermined value; and the processor is configured with the program such that operation as the potential usable power calculator comprises operation as the potential usable power calculator configured to update the estimated value for the potential usable power in response to the difference being greater than or equal to a predetermined value.

4. A management device configured to manage a power generator, a normal appliance, and a designated appliance, the management device comprising a processor configured with a program to perform operations comprising:

operation as a potential usable power calculator configured to compute an estimated value of a potential usable power, the potential usable power comprising power received from the power generator excluding power consumption of the normal appliance and a feed-in amount of power capable of being sold;

operation as a planned usage determination unit configured to identify a planned usage time for the designated appliance;

operation as an effective time determination unit configured to identify, based on the estimated value of the potential usable power, a continuous effective time in which a physical quantity changed by the designated appliance using the potential usable power is effective; and operation as a scheduler configured to create an operation schedule indicating at least an operation start time for the designated appliance, such that the designated appliance is operated using the potential usable power, based on: the planned usage time, the estimated value of the potential usable power, and the continuous effective time;

wherein the processor is configured with the program such that the potential usable power calculator computes a measurement value of the potential usable power by subtracting a measurement value of the power consumption of the normal appliance and a measurement value of the feed-in amount of power from a measurement value for the power received from the power generator.

\* \* \* \* \*